(12) United States Patent
Kobyakov et al.

(10) Patent No.: US 9,453,969 B2
(45) Date of Patent: Sep. 27, 2016

(54) GRATING-COUPLER ASSEMBLY WITH SMALL MODE-FIELD DIAMETER FOR PHOTONIC-INTEGRATED-CIRCUIT SYSTEMS

(71) Applicant: CORNING OPTICAL COMMUNICATIONS LLC, Hickory, NC (US)

(72) Inventors: Andrey Kobyakov, Hickory, NC (US); Sergey Anatol'evich Kuchinsky, St. Petersburg (RU); Xue Liu, Advance, NC (US); Aramais Zakharian, Painted Post, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 36 days.

(21) Appl. No.: 14/264,341

(22) Filed: Apr. 29, 2014

(65) Prior Publication Data
US 2015/0309261 A1    Oct. 29, 2015

(51) Int. Cl.
*G02B 6/30* (2006.01)
*G02B 6/12* (2006.01)
*G02B 6/124* (2006.01)
*G02B 6/122* (2006.01)
*G02B 6/34* (2006.01)
*G02B 6/04* (2006.01)
*G02B 6/26* (2006.01)

(52) U.S. Cl.
CPC ............. *G02B 6/305* (2013.01); *G02B 6/124* (2013.01); *G02B 6/1228* (2013.01); *G02B 6/34* (2013.01); *G02B 6/04* (2013.01); *G02B 6/262* (2013.01); *G02B 2006/12061* (2013.01); *G02B 2006/12107* (2013.01); *G02B 2006/12147* (2013.01)

(58) Field of Classification Search
None
See application file for complete search history.

(56) References Cited

U.S. PATENT DOCUMENTS

| | | | |
|---|---|---|---|
| 7,162,124 B1 | 1/2007 | Gunn, III et al. | 385/37 |
| 7,260,293 B1 | 8/2007 | Gunn, III et al. | 385/37 |
| 7,366,380 B1 | 4/2008 | Peterson et al. | 385/47 |
| 8,280,207 B2 | 10/2012 | Pinguet et al. | 385/37 |
| 2009/0087141 A1 | 4/2009 | Kim et al. | |
| 2011/0274438 A1 | 11/2011 | Fiorentino et al. | |
| 2012/0170111 A1 | 7/2012 | Doerr et al. | |

(Continued)

FOREIGN PATENT DOCUMENTS

EP    2410361 A1    1/2012
WO    2012134632 A2    10/2012

OTHER PUBLICATIONS

Barclay et al, "Design of Photonic Crystal Waveguides for Evanescent Coupling to Optical Fiber Tapers and Integration with High-Q Cavities", Journal of the Optical Society of America, vol. 20, No. 11, Nov. 1, 2003, pp. 2272-2284, retrieved from the internet on Jul. 7, 2015.

(Continued)

*Primary Examiner* — Jerry Rahll

(57) ABSTRACT

A grating-coupler assembly with a small mode-field diameter for photonic-integrated-circuit systems is disclosed. The assembly includes a silicon waveguide supported by a silicon-on-insulator substrate, and a grating coupler supported by the substrate and optically coupled to the silicon waveguide. The assembly has an optical fiber with a mode-field diameter in the range from 5 μm to 6 μm. One end of the optical fiber is disposed adjacent the grating coupler to define a coupling efficiency of 0.7 or greater.

18 Claims, 11 Drawing Sheets

(56) References Cited

U.S. PATENT DOCUMENTS

2013/0022316 A1    1/2013   Pelletier et al.
2013/0216184 A1    8/2013   Kopp et al.

OTHER PUBLICATIONS

"Optical Fibers", Jan. 28, 2014, pp. 1-6, retrieved from the internet on Jul. 7, 2015.
PCT International Search Report, Application No. PCT/US2015/027417, Jul. 14, 2015, 4 pages.
PCT Written Opinion, Application No. PCT/US2015-027417, Jul. 14, 2015, 7 pages.
A Grating-Coupler-Enabled CMOS Photonics Platform, Attila Mekis et al, IEEE Journal of Selected Topics in Quantum Electronics, vol. 17, No. 3, May/Jun. 2011, 12 pages.
Addressing Fiber-to-Chip Coupling Issues in Silicon Photonics, Jose Vicente Galan, Thesis submitted for Doctor of Philosophy degree, Dec. 2010, 202 pages.
Compact Focusing Grating Couplers for Silicon-on-Insulator Integrated Circuits, IEEE Photonics Technology Letters, vol. 19, No. 23, Dec. 1, 2007, 3 pages.
High-Efficiency Fiber-to-Chip Coupling Using Low-Loss Tapered Single-Mode Fiber, T. Alder et al, IEEE Photonics Technology Letters, vol. 12, No. 8, Aug. 2000, 3 pages.
High-Efficiency Fiber-to-Chip Grating Couplers Realized Using an Advanced CMOS-Compatible Silicon-On-Insulator Platform, D. Vermeulen et al, Optics Express, vol. 18, No. 17, Aug. 16, 2010, 6 pages.
High Efficiency Grating Coupler Between Silicon-On-Insulator Waveguides and Perfectly Vertical Optical Fibers, Roelkens et al, Optics Letters, vol. 32, No. 11, Jun. 1, 2007, 3 pages.
High Efficiency Silicon-on-Insulator Grating Coupler Based on a Poly-Silicon Overlay, Roelkens et al, Optics Express, vol. 14, No. 24, Nov. 27, 2006, 9 pages.
Numerical Solution of Initial Boundary Value Problems Involving Maxwell's Equations in Isotropic Media, Kane S. Yee, IEEE Transactions on Antennas and Propagation, vol. AP-14, No. 3, May 1966, 6 pages.
Optimized Coupling of a Gaussian Beam into an Optical Waveguide with a Grating Coupler: Comparison of Experimental and Theoretical Results, D. Pascal et al, Applied Optics, vol. 36, No. 12, Apr. 20, 1997, 5 pages.
Quantifying Loss Minimisation in Single-Mode Fibre Tapers, Electronics Letters, vol. 22, No. 17, Aug. 14, 1986, 3 pages.
Reflectionless Grating Couplers for Silicon-on-Insulator Photonic Integrated Circuits, D. Vermeulen et al, Optics Express, vol. 20, No. 20, Sep. 24, 2012, 6 pages.
The Shape of Fiber Tapers, Timothy A. Birks et al, Journal of Lightwave Technology, vol. 10, No. 4, Apr. 1992, 7 pages.
T. Pinguet, P.M. De Dobbelaere, D. Folz, S. Gloeckner, S. Hovey, Y. Liang, M. Mack, G. Masini, A. Mekis, M. Peterson, S. Sahni, J. Schramm, M. Sharp, D. Song, B.B. Welch, K. Yokoyama, S. Yu, "Silicon photonics multicore transceivers," Photonics Society Summer Topical Meeting Series, 2012 IEEE 238-239 WC4.1(invited) Seattle, WA (2012).

GRATING-COUPLER ASSEMBLY WITH SMALL MODE-FIELD DIAMETER FOR PHOTONIC-INTEGRATED-CIRCUIT SYSTEMS

FIELD

The present disclosure relates to optical-fiber couplers, and more particularly to grating-coupler assemblies having a small mode-field diameter for use with photonic-integrated-circuit systems.

BACKGROUND

There is increasing commercial interest in integrating fiber optical systems with photonic integrated circuits (PICs; also called "photonic chips") to create photonic-integrated-circuit systems. Such systems can be used to form a variety of devices, such as antenna systems (e.g., phased-array antennas), interferometers (e.g., Mach-Zehnder interferometers), biosensors and spectrometers.

PIC systems typically require mechanisms for coupling light into and/or out of optical waveguides of the PIC with a reasonable coupling efficiency. Single-mode fibers (SMFs) are conventionally used for grating-based, fiber-to-chip optical coupling. The conventional wisdom is that SMFs with a small mode-field diameter (MFD) (e.g., less than the conventional MFD of about 10 microns (μm) for conventional SMFs) would have a reduced coupling efficiency between a given fiber and the corresponding on-chip waveguide due to the smaller number of grating periods overlapping with the mode field. This has resulted in a lower limit on the footprint (area) of the grating couplers in silicon-on-insulator (SOI) integrated photonic systems. Yet, it would be advantageous to have as small a footprint as possible to increase the density of the optical connections for photonic-integrated-circuit systems.

SUMMARY

Aspects of the disclosure are directed to a grating-coupler assembly and related methods for optically coupling light into or out of a PIC. The grating-coupler assembly can have a relatively high coupling efficiency of 0.7 or greater by employing an optical fiber having a relatively small MFD. The small MFD allows for reducing the area or footprint of the corresponding grating coupler supported by the SOI substrate of the PIC. This in turn increases the degree of integration of the optical-fiber connections to the PIC. The optical fiber can be a single-core fiber or a multi-core fiber.

An aspect of the disclosure is a grating-coupler assembly for optically coupling light into or out of a PIC. The assembly includes: a silicon-on-insulator (SOI) substrate; at least one silicon waveguide supported by the SOI substrate; at least one grating coupler supported by the SOI substrate and optically coupled to the at least one silicon waveguide; an optical fiber having an end and at least one core having a mode-field diameter $MFD_{60}$ in the range 5 μm≤$MFD_{60}$≤6 μm, wherein the optical-fiber end is disposed adjacent the at least one grating coupler; and wherein the at least one core of the optical fiber and the at least one grating coupler define a coupling efficiency CE≥0.7.

Another aspect of the disclosure is a grating-coupler assembly for optically coupling light into or out of a PIC. The assembly includes: a silicon waveguide supported by a SOI substrate; a grating coupler supported by the SOI substrate and optically coupled to the silicon waveguide, the grating coupler having a coupler footprint; an optical fiber having an end and at least one core having a mode-field diameter $MFD_{60}$ in the range 5 μm≤$MFD_{60}$ 6 μm, wherein the optical-fiber end is disposed adjacent the grating coupler, with an intervening medium of refractive index $n_m$>1 between the optical-fiber end and the grating coupler; wherein the at least one core of the optical fiber and the grating coupler define a coupling efficiency CE≥0.7; and wherein the coupler footprint is reduced by at least 15% from a prior-art coupler footprint defined by a single-mode optical fiber having a mode-field diameter of nominally 10 μm.

Another aspect of the disclosure is a method of optically coupling light into a PIC that includes at least one grating coupler optically coupled to at least one silicon waveguide. The method includes: transmitting light through at least one core of an optical fiber having an end, the at least one core defining a mode-field diameter $MFD_{60}$ for the transmitted light, wherein the mode-field diameter $MFD_{60}$ is in the range 5 μm≤$MFD_{60}$≤6 μm; emitting the transmitted light from the optical-fiber end to the at least one grating coupler; and directing the emitted light from the at least one grating coupler to the at least one silicon waveguide such that the optical coupling of light from the at least one core to the at least one silicon waveguide is accomplished with a coupling efficiency CE≥0.7.

Another aspect of the disclosure is a method of optically coupling light from a PIC that includes at least one grating coupler optically coupled to at least one silicon waveguide. The method includes: transmitting light from the at least one silicon waveguide to the at least one grating coupler; directing the transmitted light from the at least one grating coupler to at least one core of an optical fiber having an end arranged adjacent the at least one grating coupler, the at least one core defining a mode-field diameter $MFD_{60}$ for the transmitted light, wherein the mode-field diameter $MFD_{60}$ is in the range 5 μm≤$MFD_{60}$≤6 μm; and wherein optical coupling of light from the at least one silicon waveguide to the at least one core is accomplished with a coupling efficiency CE≥0.7.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s) and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1:
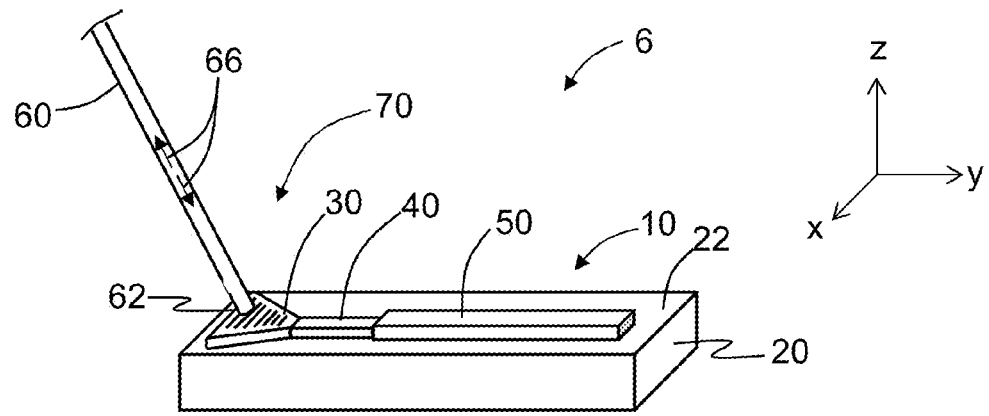
FIG. 1 is an elevated view of an example photonic-integrated-circuit (PIC) system that includes a PIC and an optical fiber ("fiber") optically coupled to the PIC via a grating coupler using an optional intervening medium, wherein the fiber, grating coupler and optional intervening medium define a grating-coupler assembly.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute a part of this Detailed Description.

The entire disclosure of any publication or patent document mentioned herein is incorporated by reference.

Cartesian coordinates are shown in some of the Figures for the sake of reference and are not intended to be limiting as to direction or orientation.

In the discussion below, the term "photonic integrated circuit" or "PIC" is used to describe an integrated circuit device that can process both electrical signals and optical signals, including converting between electrical and optical signals. An exemplary photonic chip includes optical, electrical and electro-optical components.

The mode-field diameter or MFD is a measure of the spot size or beam width of light propagating in an optical fiber. The MFD is a function of the source wavelength, fiber core radius ($r_0$) and fiber refractive index profile n(r). In the examples and analysis disclosed herein, the mode-field diameter MFD was taken at the radius corresponding to the 1/e location of the electric field. The MFD of a conventional single-mode optical fiber is denoted herein as $MFD_C$ and is assumed to be nominally 10 μm, while the MFD of the single-mode fiber 60 having a smaller MFD than the conventional $MFD_C$ as disclosed below is denoted $MFD_{60}$.

The term "relative refractive index" as used herein is defined as:

$$\Delta(r)=[n(r)^2-n_{REF}^2)]/2n(r)^2,$$

where n(r) is the refractive index at radius r, unless otherwise specified. The relative refractive index is defined at 1,550 nm unless otherwise specified. In one aspect, the reference index $n_{REF}$ is that for silica glass. In another aspect, $n_{REF}$ is the maximum refractive index of the cladding. As used herein, the relative refractive index is represented by Δ and its values are given in units of "%," unless otherwise specified. In cases where the refractive index of a region is less than the reference index $n_{REF}$, the relative refractive index is negative and the region can be said to be depressed or to have a depressed index, and the minimum relative refractive index is calculated at the point at which the relative index is most negative unless otherwise specified. In cases where the refractive index of a region is greater than the reference index $n_{REF}$, the relative refractive index is positive and the region can be said to be raised or to have a positive index.

The term "dopant" as used herein refers to a substance that changes the relative refractive index of glass relative to pure (undoped) $SiO_2$. One or more other substances that are not dopants may be present in a region of an optical fiber (e.g., the core) having a positive relative refractive index Δ.

The descriptions below of grating-coupler assembly 70 assume the use of light 66 having a single polarization in combination with a single-polarization grating coupler 30 for ease of description and illustration. However, grating coupler 30 can include two linearly superimposed (i.e., independent) sets of grating lines (e.g., elliptical grating lines) that can accommodate dual-polarization light 66. Thus, a dual-polarization embodiment of grating-coupler assembly 70 is expected to have generally the same performance as its single-polarization counterpart.

PIC System

FIG. 1 is an elevated view of an example PIC system 6 that includes a PIC 10. The PIC 10 includes a SOI substrate 20 with an upper surface 22 that supports a number of components, such as at least one grating coupler 30, at least one silicon (channel) waveguide 40, and one or more additional PIC components 50 optically coupled to the at least one silicon waveguide. The one or more PIC components 50 can include, for example, one or more of a second grating coupler, a photodetector, a modulator, a polarizer, a beamsplitter, a coupler, a reflector, an optical amplifier, a filter, an interferometer, etc. The one or more PIC components 50 can include active components, passive components or a combination of active and passive components.

The PIC system 6 also includes an optical fiber ("fiber") 60 with a relatively small $MFD_{60}$ as described below. The fiber 60 is operably arranged relative to grating coupler 30. The fiber 60 includes an end 62 and supports the transmission of guided light 66, which can travel in either direction within the fiber depending on whether the light is being coupled into or out of the fiber. The fiber 60 may be connected at its opposite end (not shown) to a light source, a photodetector or another device (e.g., another PIC, not shown). The fiber 60, grating coupler 30, and an optional intervening medium (introduced and discussed below) define a grating-coupler assembly 70 for PIC system 6. The grating-coupler assembly 70 can also include multiple fibers 60 and multiple grating couplers 30.

Grating-Coupler Assembly

Figure 2:
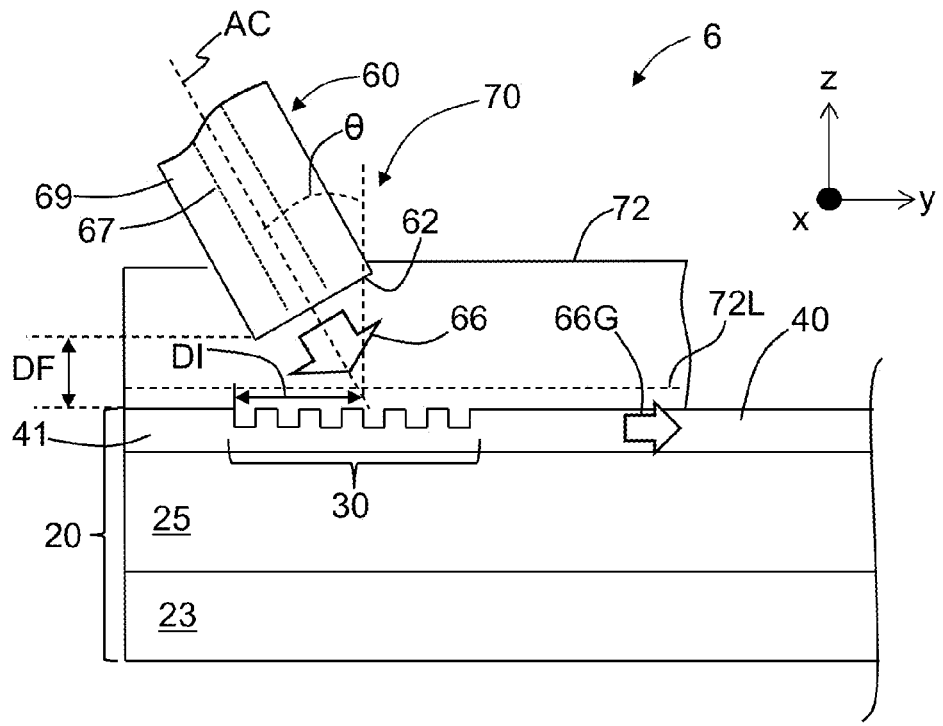
FIG. 2 is a close-up view of the grating-coupler assembly of FIG. 1.
Figure 3A:
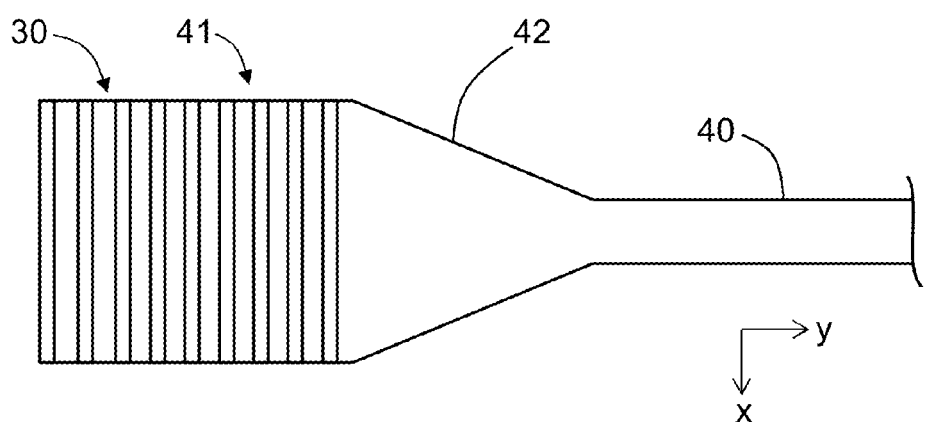
FIGS. 3A and 3B are top-down views of example configurations of a grating coupler and silicon waveguide optically connected via a tapered section.
Figure 3B:
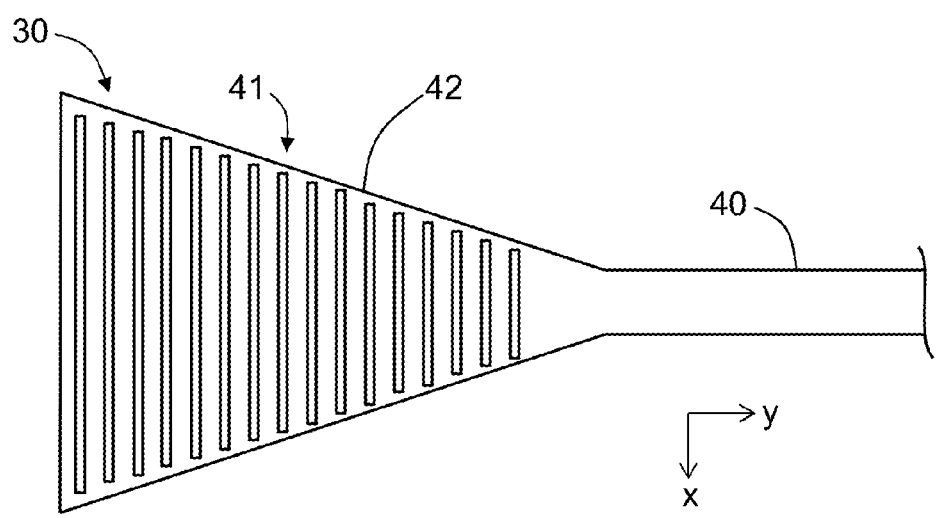

FIG. 2 is a close-up view of the grating-coupler assembly 70 of PIC system 6, with fiber end 62 of fiber 60 residing adjacent grating coupler 30. An example SOI substrate 20 includes a silicon substrate 23, a silicon-dioxide ($SiO_2$) layer 25 atop the silicon substrate, and silicon waveguide 40 atop the $SiO_2$ layer. The grating coupler 30 is formed in a portion of a silicon layer 41 that also defines silicon waveguide 40. FIGS. 3A and 3B are top-down views that show example configurations wherein grating coupler 30 and silicon waveguide 40 are optically connected via a tapered section 42.

The fiber 60 is arranged such that fiber end 62 is disposed adjacent grating coupler 30 so that light 66 exiting the fiber is incident upon grating coupler 30, or light exiting the grating coupler is incident upon the fiber end. In an example, fiber 60 is arranged at an angle θ relative to the z-direction. In an example, an intervening medium 72 that is generally transparent to infrared light (e.g., 1,550 nm) resides between fiber end 62 and grating coupler 30. In an example, intervening medium 72 is used to support fiber 60 in position relative to grating coupler 30. Examples of intervening medium 72 are UV-curable epoxy and index-matching gel.

In some configurations grating coupler 30 and silicon waveguide 40 may be covered by one or more transparent layers 72L (shown as a dashed line in FIG. 2) reserved for other PIC functions, as described for example in the publication by A. Mekis et al., entitled "A grating-coupler-enabled CMOS photonics platform," IEEE J. Sel. Top. Quant. El. 17(3), 597-608 (2011). Thus, in an example embodiment, intervening medium 72 may include one or more such transparent layers 72L.

The fiber 60 is spaced apart from grating coupler 30 by a fiber distance DF, which in an example is less than the Rayleigh range that characterizes beam divergence due to diffraction (i.e., $\pi \cdot (BW)^2 \cdot n/\lambda_0$, where BW is the beam waist of guided light 66) so that any beam divergence of the light over this distance (e.g., DF≈10 μm) is small and can be ignored.

The fiber 60 and grating coupler 30 also define an impact distance DI, which is defined as the distance from the mode-center of light 66 to the edge of the grating coupler. The mode-center of light 66 is nominally the central axis AC of fiber 60 for a single-core fiber. When fiber 60 is a MCF, then the mode-center of light 66 from each core is nominally defined by the corresponding core's central axis (not shown).

The emitted light 66 from fiber end 62 is received by grating coupler 30 and is directed to travel in silicon waveguide 40 as guided light 66G. The coupling efficiency (CE) of the light-coupling process is defined by the amount of emitted light 66 from fiber 60 coupled into silicon waveguide 40 as compared to the total amount of emitted light. The coupling efficiency CE thus generally ranges from 0 to 1. The coupling efficiency CE can also be expressed in $dB = 10 \cdot Log_{10}(P_C/P_T)$, where $P_C$ is the amount of coupled optical power into silicon waveguide 40 and $P_T$ is the total optical power emitted from fiber end 62. It is also noted that light 66 can travel in the opposite direction, i.e., from silicon waveguide 40 to grating coupler 30 and then to fiber 60. In this case, the coupling efficiency CE is the amount of light 66 emitted from silicon waveguide 40 and coupled into fiber 60 as compared to the total amount of emitted light.

In an example, fiber 60 is a SMF and has a core 67 surrounded by a cladding 69. As noted above, fiber 60 has a relatively small $MFD_{60}$, i.e., one that is substantially less than the standard SMF $MFD_C$ of about 10 μm. In an example, the $MFD_{60}$ is in the range 5 μm ≤ $MFD_{60}$ 6 μm, and in a particular example is nominally 5.4 μm. The grating-coupler assembly 70 that utilizes fiber 60 with the aforementioned small $MFD_{60}$ can maintain low-loss coupling, i.e., −1.5 dB or better (i.e., a coupling efficiency of about 0.7 or greater) in either direction of light travel. Example small-MFD fibers 60 are discussed below.

Reduced Coupler Footprint

The use of fiber 60 can result in a substantial reduction in the amount of area ("coupler footprint") required for grating coupler 30 as compared to the amount of area required when using conventional SMF. The reduction in the footprint of grating coupler 30 can be approximated by comparing a projected area AP of light 66 onto the grating coupler for the conventional SMF fiber and for fiber 60.

For a given MFD, the projected area AP is given by $AP = \pi \cdot (MFD/2)^2 \cdot Cos(\theta)$, where θ is the aforementioned angle between central axis AC and the plane perpendicular to grating coupler 30 (see FIG. 2). If we denote the projected area AP for the conventional SMF with $MFD_C$ as $AP_C$ and the projected area $AP_{60}$ formed by using fiber 60 as $AP_{60} = \pi \cdot (MFD_{60}/2)^2 \cdot Cos(\theta)$, then we can define an area-reduction ratio R as:

$$R = AP_{60}/AP_C = [\pi (MFD_{60}/2)^2 \cdot Cos(\theta)] / [\pi \cdot (MFD_C/2)^2 \cdot Cos(\theta)] = [MFD_C/MFD_{60}]^2$$

If we take $MFD_C = 10$ μm and $MFD_{60}$ as ranging from 5 μm to 6 μm, then the area-reduction ratio R ranges from 0.25 to about 0.35, which represents between a 75% and 65% reduction in the coupler footprint. This reduction in the coupler footprint can be even greater when we consider more densely packed silicon waveguides 40. In one example, the coupler footprint is reduced by at least 10%, while in another example the coupler footprint is reduced by at least 15%.

When the routing of silicon waveguides 40 is taken into account, the total coupling area (i.e., total coupling footprint) occupied by grating couplers 30 and silicon waveguides 40 (i.e., the coupler footprint and the waveguide footprint) can be reduced by up to 50% as compared to the prior-art total coupling area associated with a standard SMF. In an example, the total coupling footprint is reduced by at least 10%.

In an example where fiber 60 is a multi-core fiber (MCF) with multiple cores 67 embedded in a single cladding 69, the reduction in the coupler footprint can be even greater because of both the reduced core size and the reduced core-to-core distance with more tightly localized modes. Consequently, tapered section 42, which connects grating coupler 30 to silicon waveguide 40, can also be made smaller.

A reduced coupler footprint is advantageous for increasing integration density in PICs 10. In the case of fiber 60 in the form of a MCF, a smaller diameter of cladding 69 may be advantageous from the point of view of mechanical properties of the MCF (e.g., improved bending properties). An example bandwidth of grating-coupler 70 employing fiber 60 is about 60 nm, which is comparable to that of a standard SMF-based grating coupler.

Figure 4A:
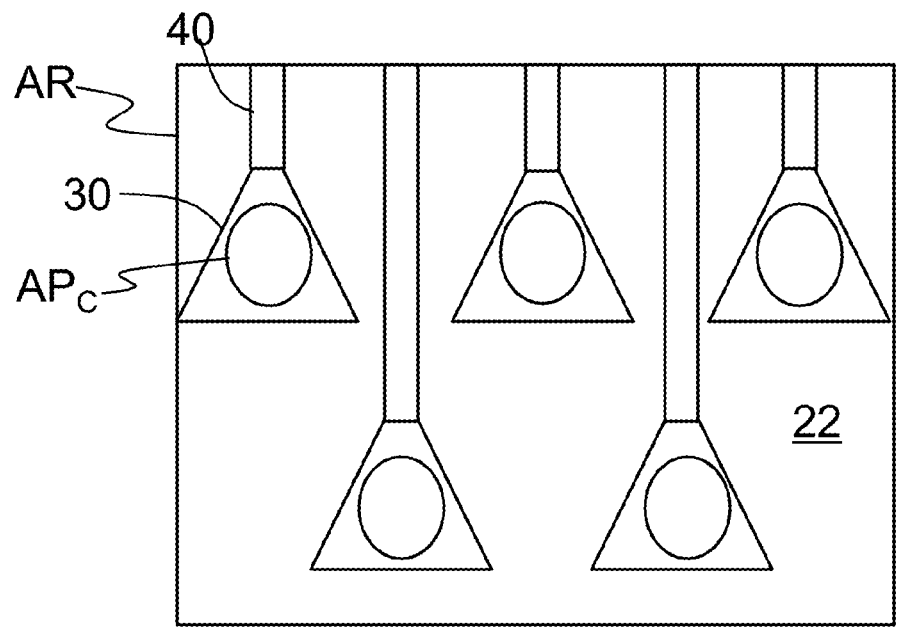
FIG. 4A is a top-down view of an area on the surface of the SOI substrate showing a prior-art arrangement of grating couplers sized to accommodate a conventional MFD from a conventional SMF and also showing the projected area of the light from the fiber.
Figure 4B:
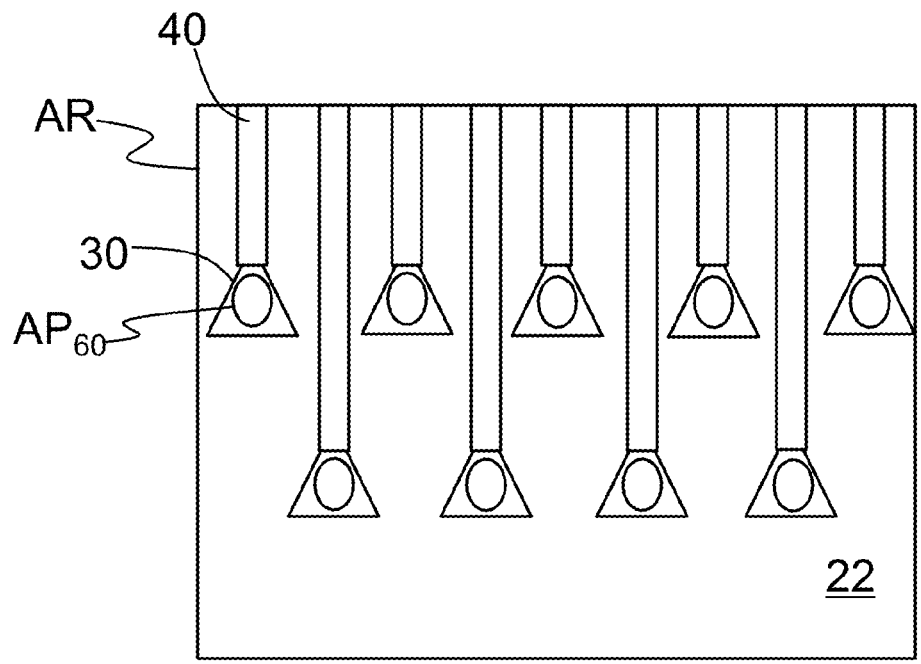
FIG. 4B is similar to FIG. 4A and shows the same area on the surface of the SOI substrate, but with grating couplers scaled down in size to have about half the area of the grating couplers of FIG. 4A based on the smaller $MFD_{60}$ and projected area $AP_{60}$ of the fiber used in the grating-coupler assembly disclosed herein.

FIG. 4A is a top-down view of an area on surface 22 of SOI substrate 20 showing a prior-art arrangement of grating couplers 30 sized to accommodate a conventional MFD from a conventional SMF. The conventional projected area $AP_C$ is shown on each of the grating couplers 30. FIG. 4B is similar to FIG. 4A and shows the same area AR on surface 22 of SOI substrate 20, but with grating couplers 30 scaled down in size to have about half the area of the grating couplers of FIG. 4A based on the smaller $MFD_{60}$ associated with fiber 60. The projected area $AP_{60}$ is also shown on each of the grating couplers 30. The smaller grating couplers 30 of FIG. 4B allow for more grating couplers to fit within the same area AR, thereby providing a greater density of optical connections to PIC 10 (i.e., greater integration density).

In the simplified example configurations shown in FIGS. 4A and 4B, the integration density increase is from five to nine grating couplers 30 for the same surface area AR, which represents an increase in integration density of 80%. Depending on the precise configuration and size of grating couplers 30 and silicon waveguides 40, it is estimated that in some embodiments, the integration density can be increased by up to 50%, while in other embodiments it can be increased by up to 30%.

Grating Coupler

Figure 5:
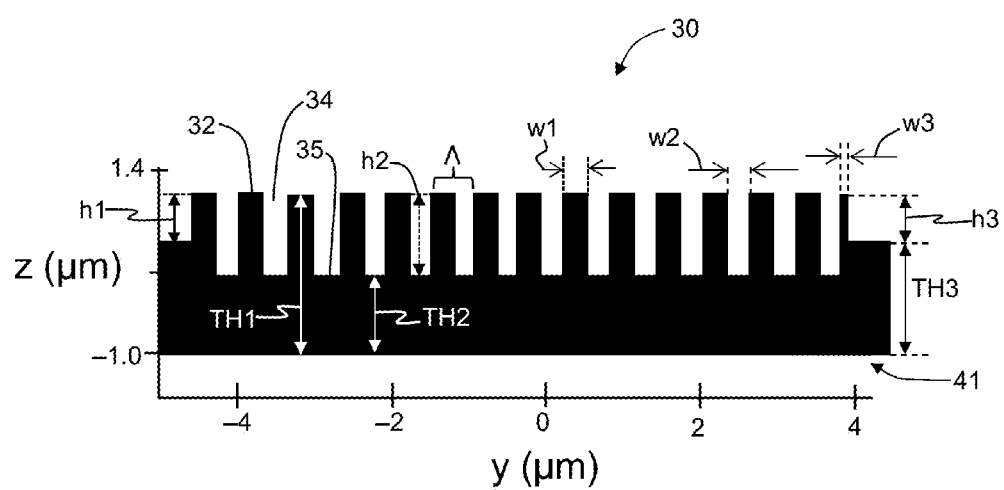
FIG. 5 is a cross-sectional view of an example grating-coupler configuration.

FIG. 5 is a cross-sectional view of an example grating coupler 30 formed in silicon waveguide 40. The grating coupler 30 includes grating lines 32 and grating spaces 34. The grating coupler 30 includes the following parameters: a height h1 of the first (i.e., leftmost) grating line 32; a height h2 of the grating lines relative to a grating floor 35; a width w1 of grating lines 32; a width w2 for grating spaces 34; and a width w3 and a height h3 of the last (rightmost) grating line 32. The nominal period Λ of grating coupler 30 is given by Λ=w1+w2. The overall thickness of grating coupler 30 measured at a given grating line 32 is TH1, while the thickness to grating floor 35 is denoted TH2. The thickness of silicon layer 41 is denoted TH3.

Coupling Efficiency

The coupling efficiency CE of grating-coupler assembly 70 was analyzed numerically for an example fiber 60 having a $MFD_{60}$=5.4 µm, and wherein the grating coupler parameters of grating coupler 30 were allowed to vary to optimize the coupling efficiency CE. The numerical analysis was performed using the Finite-Difference Time-Domain (FDTD) method. The period Λ and fill-fraction of the individual grating lines 32 and spaces 34 were also optimized numerically to maximize mode overlap between fiber 60 and grating coupler 30, resulting in a maximum coupling efficiency CE of about 70% and a 60-nm, 1-dB bandwidth in the C-band (i.e., 1,530 nm to 1,565 nm). Example nominal values for the grating parameters are: grating period Λ=600 nm; w1=300 nm; w2=300 nm; w3=90 nm; h1=h3=120 nm; h2=200 nm; TH1=370 nm, TH2=170 nm; and TH3=250 nm. The number of grating periods is 16. The optimized values are found within +/−30% of the example values. The refractive index of silicon waveguide 40 is 3.45 at λ=1,550 nm. The refractive index of the buried oxide layer 25 on which silicon waveguide layer 40 is deposited (see FIG. 2) is 1.45 at 1,550 nm.

The left end of grating coupler 30 is not treated in any special way but the mode-field intensity needs to be small enough at the left end to not have a substantial impact on the coupling. The coupling efficiency CE is reduced by about 1% when the number of optimized grating lines 32 is reduced from 16 to 14. The right edge of grating coupler 30 has one narrow grating line 32 of width w3≈90 nm that positively contributes to the coupling efficiency CE.

Figure 6A:
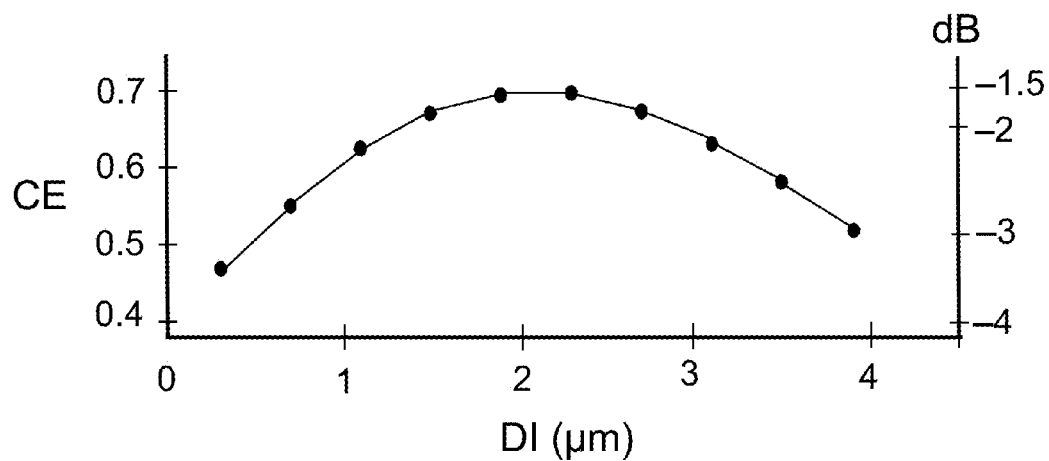
FIG. 6A is a plot of the coupling efficiency CE versus the impact distance DI (μm) for a fiber having a mode-field diameter of 5.4 μm and for a wavelength of 1,550 nanometers (nm), illustrating an optimum impact distance.

FIG. 6A is a plot of the coupling efficiency CE (left vertical axis) versus the impact distance DI (µm) for the grating-coupler assembly 70 that uses grating coupler 30 of FIG. 5. The loss in dB is also plotted on the right vertical axis. The $MFD_{60}$=5.4 µm. The plot of FIG. 6A shows a maximum coupling efficiency CE of about 0.7 at an impact distance DI in the range from about 2.4 µm to 2.8 µm.

Figure 6B:
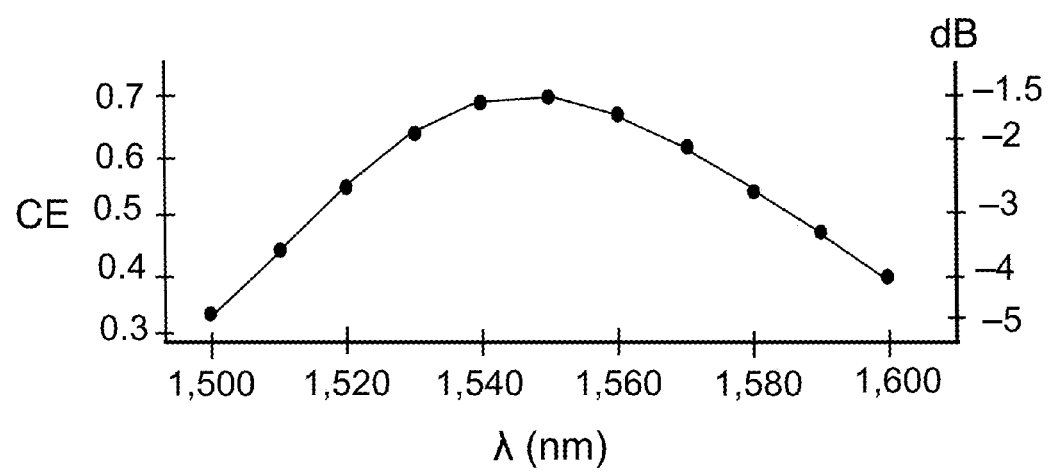
FIG. 6B is a plot of the coupling efficiency CE versus wavelength λ (nm) showing the maximum coupling efficiency at λ=1,550 nm.

FIG. 6B is similar to FIG. 6A, except that the horizontal axis is the wavelength λ (nm) of light 66 carried by and emitted from fiber 60. The impact distance DI for FIG. 6B is in the aforementioned range of 2.4 µm to 2.8 µm, i.e., the optimum range from FIG. 6A. FIG. 6B shows a maximum coupling efficiency CE at about λ=1,550 nm, which is an example of a desirable operating wavelength for PIC 10.

Figure 7A:
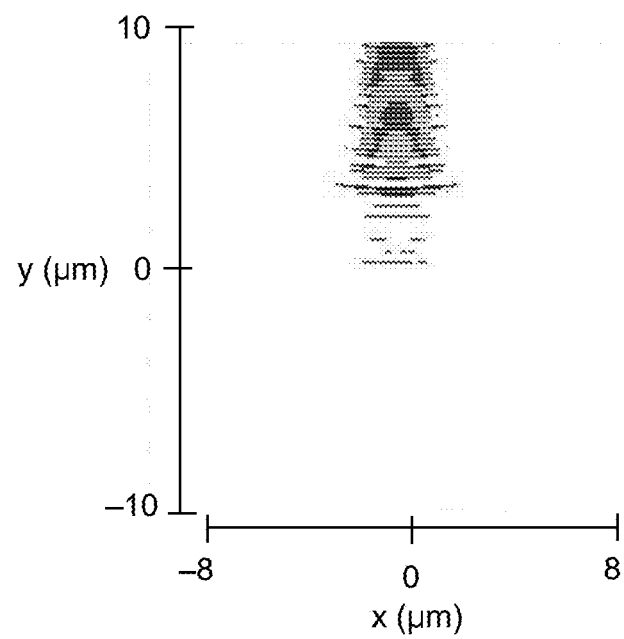
FIGS. 7A and 7B are plots of the (simulated) electric-field amplitude distribution in the x-y plane for an example grating coupler of an example grating-coupler assembly that uses a conventional SMF with $MFD_C$=10 μm (FIG. 7A) and the fiber disclosed herein with $MFD_{60}$=5.4 μm (FIG. 7B) at λ=1,550 nm, showing how the electric-field amplitude is more tightly focused for the grating-coupler assembly that employs the fiber with the smaller $MFD_{60}$.
Figure 7B:
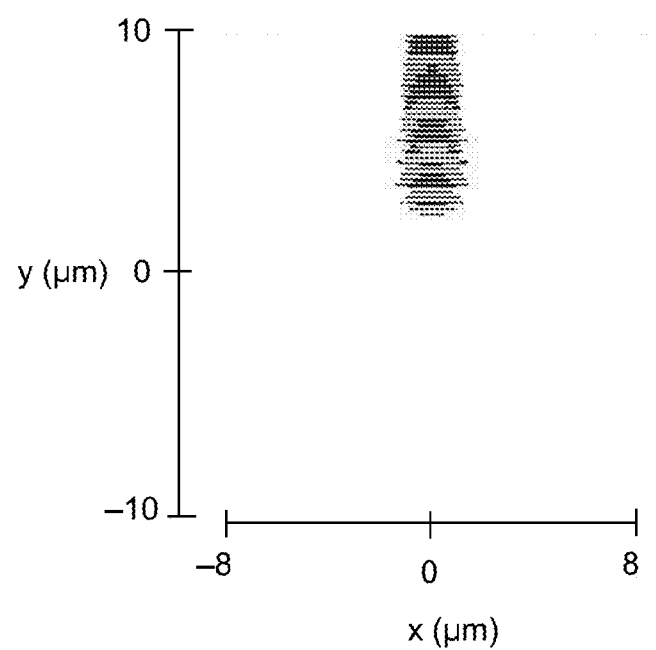

FIGS. 7A and 7B are plots of the electric-field amplitude distribution in the x-y plane of grating coupler 30 for an example grating-coupler assembly 70 that uses a conventional SMF with $MFD_C$=10 µm (FIG. 7A) and for a fiber 60 with $MFD_{60}$=5.4 µm (FIG. 7B) at λ=1,550 nm. The black-and-white plots of FIGS. 7A and 7B are based on color plots obtained using numerical simulation. The plots illustrate how the electric-field amplitude is more tightly focused in the x-direction (i.e., lateral to grating lines 32) as well as in the y-direction (i.e., the focusing direction or transverse to the grating lines). This means that the coupling footprint can be made smaller than the conventional coupling footprint associated with a standard SMF. This in turn leads to a higher density of optical connections to PIC 10, as described above. The tapered section 42 of silicon layer 41 that transitions to silicon waveguide 40 is similarly reduced in size because the taper length scales as the square of the initial width of the silicon waveguide.

Figure 8A:
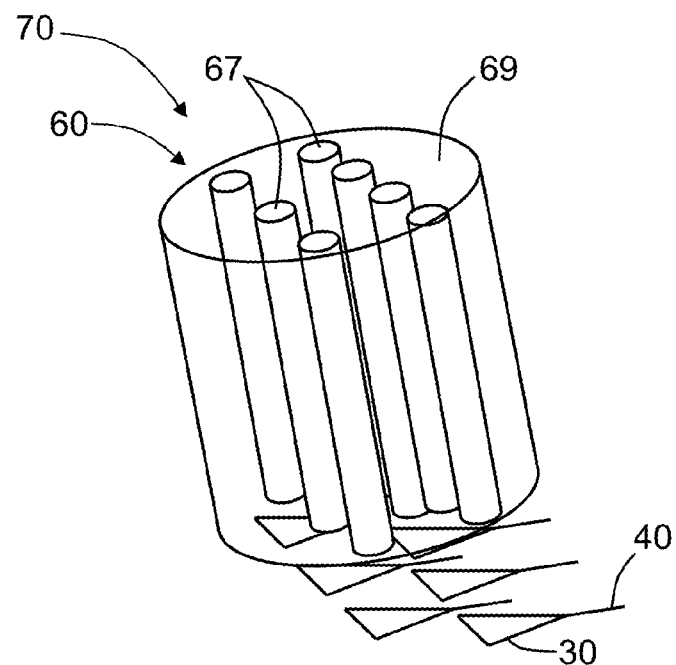
FIGS. 8A and 8B are elevated close-up views of example grating-coupler assemblies that utilize multi-core fibers, illustrating how the grating-coupler assembly of FIG. 8B that utilizes cores with a smaller $MFD_{60}$ allows for a greater integration density of grating couplers.
Figure 8B:
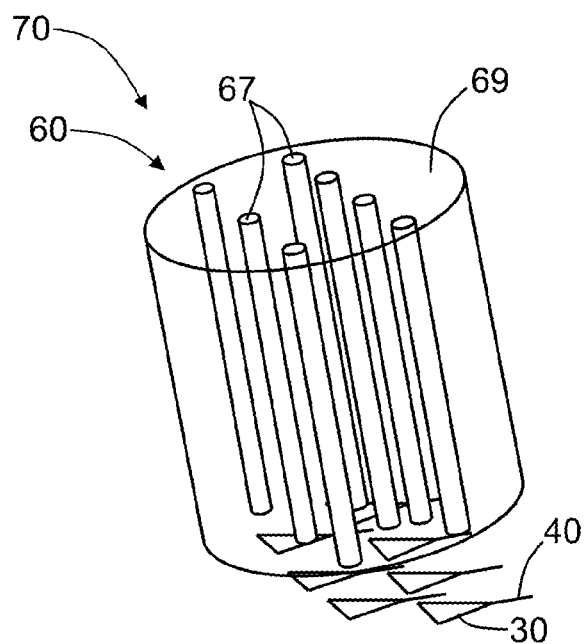

FIGS. 8A and 8B are elevated close-up views of example grating-coupler assemblies 70 each having a MCF fiber 60 with seven cores 67. FIG. 8A shows fiber 60 with conventional-sized cores 67, while FIG. 8B shows the fiber with the smaller cores that define the smaller $MFD_{60}$. The smaller cores 67 of FIG. 8B allow for a reduced coupler footprint for each grating coupler 30 and thus a higher integration density of multiple grating couplers and the corresponding fibers 60 and silicon waveguides 40.

In an example embodiment, the smaller $MFD_{60}$ of fiber 60 (as compared to the conventional SMF) is achieved by tailoring the fiber's refractive index profile. FIG. 9A is a plot of the refractive index profile n(r) versus the fiber radius r (µm) for an example fiber 60. The plot shows a transition region TR between core 67 and cladding 69. The mathematical shape of the n(r) curve is Tan h(r/w), where w=0.2 µm. The transition region TR has a width $W_{TR}$ of about 0.5 µm, and the core index is Δ=0.01. The graded transition can be achieved via Ge-doping.

Figure 9B:
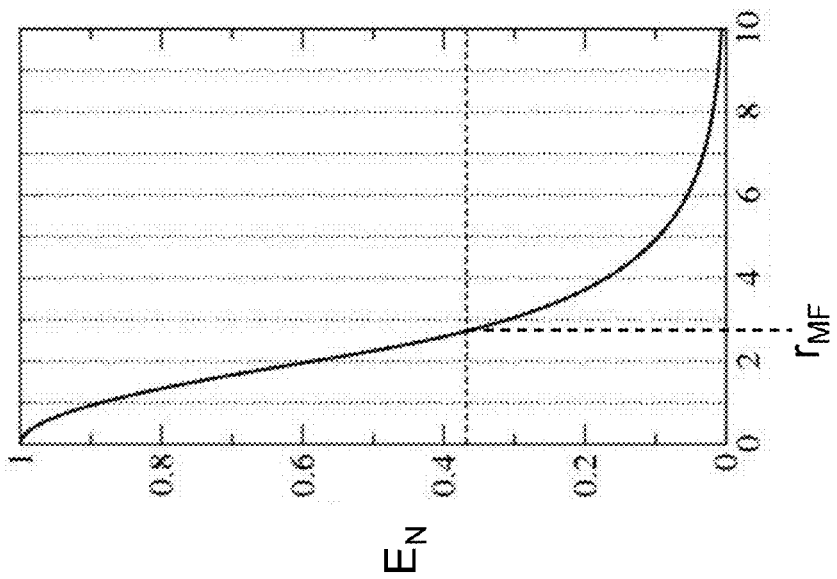
FIG. 9B is a plot of the normalized electric field $E_N$ versus radius r (μm) of the fiber, showing the calculated electric-field shape for the fiber of FIG. 9A, and showing the $MFD_{60}$ of nominally 5.4 μm.
Figure 9A:
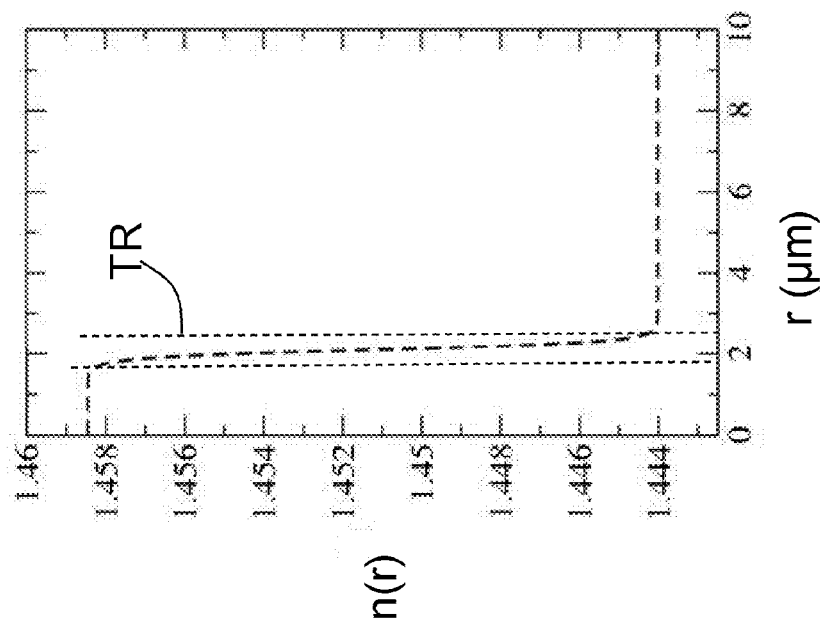
FIG. 9A is a plot of the refractive index profile n(r) versus radius r (μm) of the fiber, illustrating an example refractive index profile that generates a $MFD_{60}$ of 5.4 μm.

FIG. 9B plots the corresponding normalized electric field $E_N=E(r)/E_0$ versus radius r (μm) for the refractive index profile of FIG. 9A, and shows a mode-field radius $r_{MF}$ of 2.7 μm, which defines $MFD_{60}$=5.4 μm. For an example fiber 60 in the form a MCF that utilizes the refractive index profile n(r) of FIG. 9A, the coupling coefficient for a core-to-core distance (separation) of 27 μm is about 0.075 $m^{-1}$, compared to a value of about 1 to 2 $m^{-1}$ for standard SMF fibers having core diameters of about 9.5 μm, a relative refractive index A of about 0.004 and a core-to-core distance of about 30 μm. The coupling coefficient is a measure for coupling strength, i.e., cross-talk among fiber cores 67. A MCF fiber 60 can thus enable smaller core-to-core cross-talk. The smaller coupling coefficient also means that cores 67 can be packed more densely in a multi-core fiber 60 to increase the integration density of PIC system 6. More sophisticated refractive index profiles n(r) (e.g., with trenches, etc.) can be used to enhance other fiber characteristics such as transmission, bend-insensitivity, dispersion, etc.

Figure 10A:
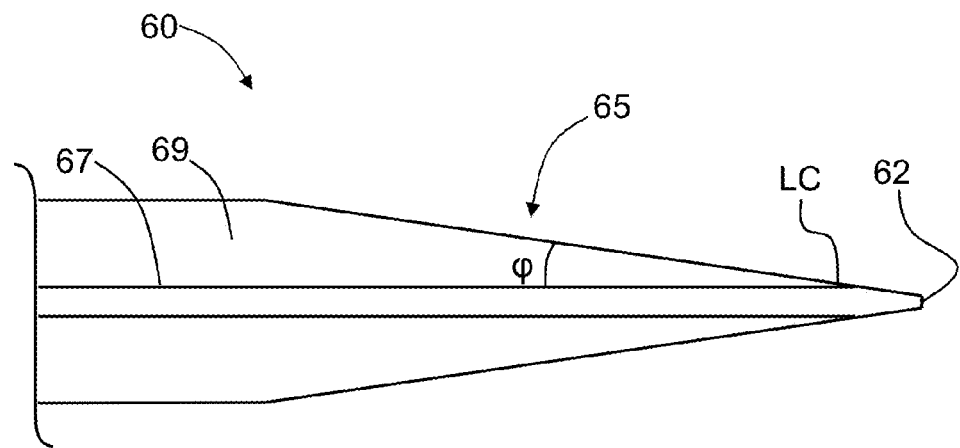
FIGS. 10A and 10B show end portions of two example tapered fibers.
Figure 10B:
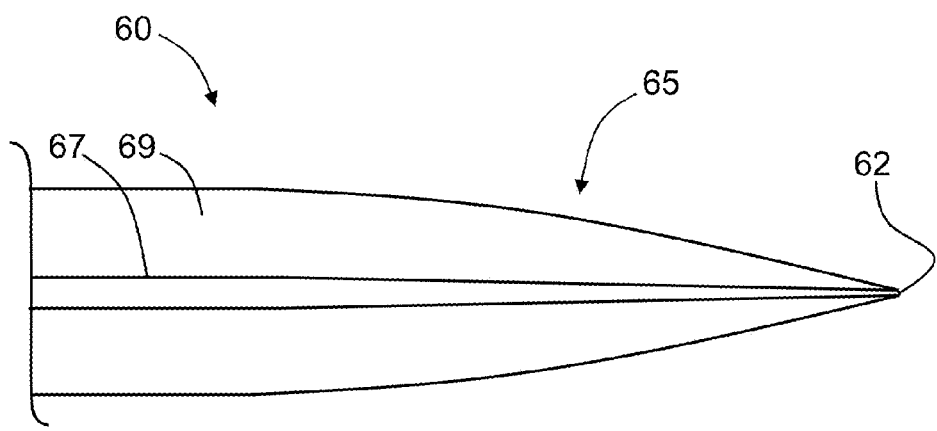

In another example embodiment, the $MFD_{60}$ of fiber 60 is tailored by tapering a standard SMF. FIGS. 10A and 10B are cross-sectional views of an end portion 65 of an example fiber 60 wherein the end portion is tapered down to fiber end 62. The tapering of fiber 60 can be performed using a number of different methods known in the art. One method involves cutting into cladding 69 to form an increasingly narrow fiber end portion 65 that looks much like a pencil end, as shown in FIG. 10A. The cutting can be performed using a laser or by chemical etching. The taper continues until a location LC where cladding 69 is completely removed, whereupon core 67 is cut to form the remaining portion of the taper. The taper has a taper angle φ, which in an example is made sufficiently small to ensure an adiabatic transition for the guided light 66G at every point along the taper.

Another method of fiber tapering includes heating end portion 65 of fiber 60 and applying a tensile force to stretch the heated end portion of the fiber. This method can be performed so that core 67 and cladding 69 both taper in a manner that substantially retains the ratio of core-to-cladding diameters, as shown in FIG. 10B. Heating end portion 65 in a uniformly hot zone allows for a taper having a decaying-exponential profile. Heating end portion 65 with a linearly varying amount of heat allows for the taper to be tailored to have anywhere from a linear to a parabolic shape.

Figure 11:
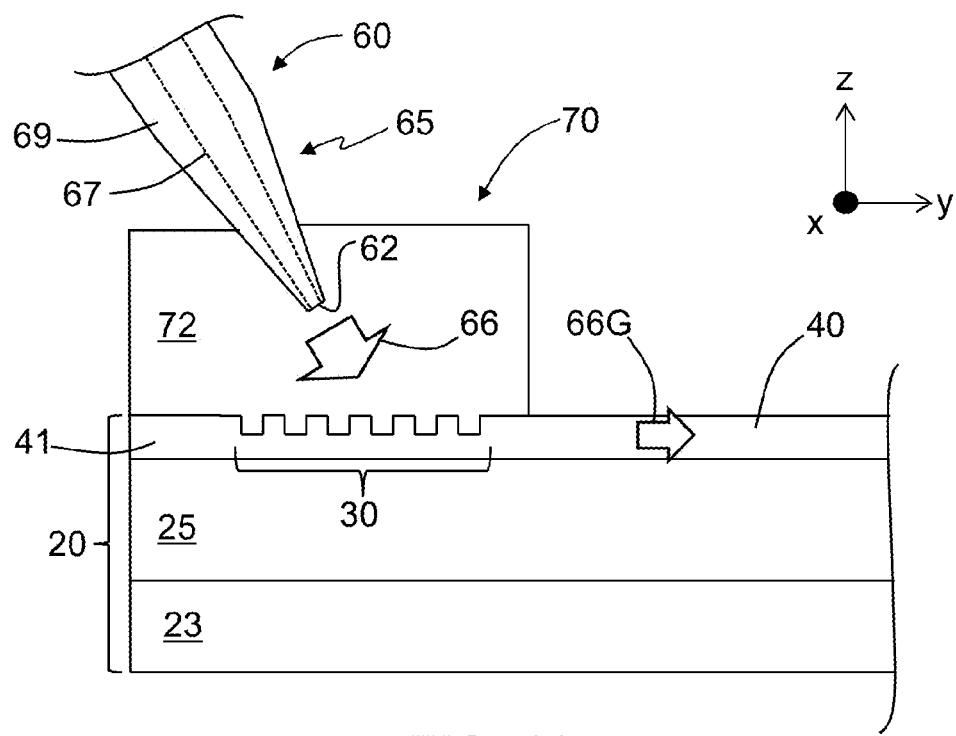
FIG. 11 is similar to FIG. 2 and illustrates an example tapered optical fiber as part of a grating-coupler assembly.

FIG. 11 is similar to FIG. 2 and illustrates example embodiments of a tapered optical fiber 60 as part of a grating-coupler assembly 70. To minimize coupling loss, the taper shape of fiber end section 65 as defined by a taper radius r(z') (where z' is along the fiber central axis AC) must satisfy the adiabatic criteria $dr/dz' \leq -r \cdot (\beta_1(r)-\beta_2(r))/2\pi$, where $\beta_1(r)$ and $\beta_2(r)$ are the local propagation constants of the fundamental mode and the mode to which power is most easily coupled, usually the $LP_{02}$ mode.

Figure 12:
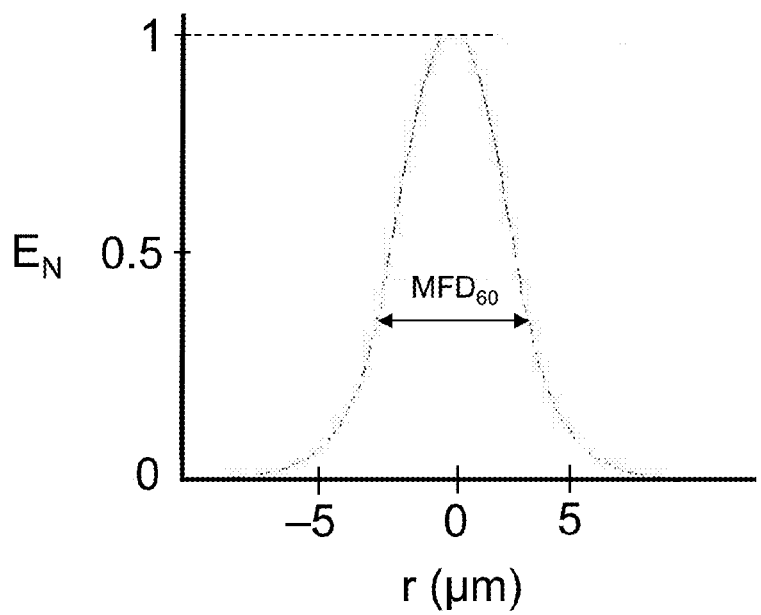
FIG. 12 is a plot of the normalized electric field $E_N$ versus radius r (μm) for the example configuration of the grating-coupler assembly as shown in FIG. 11.

In the case where intervening medium 72 of refractive index $n_m$ is used, the refractive index can be selected to achieve a desired $MFD_{60}$. For example, for SMF fiber SMF-28 60, the upper limit of $n_m$ is 1.434 (Δ=1%) to produce $MFD_{60}$=5.4 μm. The choice of the fiber tip size depends on $n_m$. When $n_m$ decreases from 1.434 (Δ=1%) to 1.304 (Δ=10%), the corresponding tip radius increases monotonically from 2.1 μm to 3.4 μm, to yield $MFD_{60}$=5.4 μm. FIG. 12 plots the normalized electric field $E_N$ versus radius r (μm) for the example configuration shown in FIG. 11.

Figure 13A:
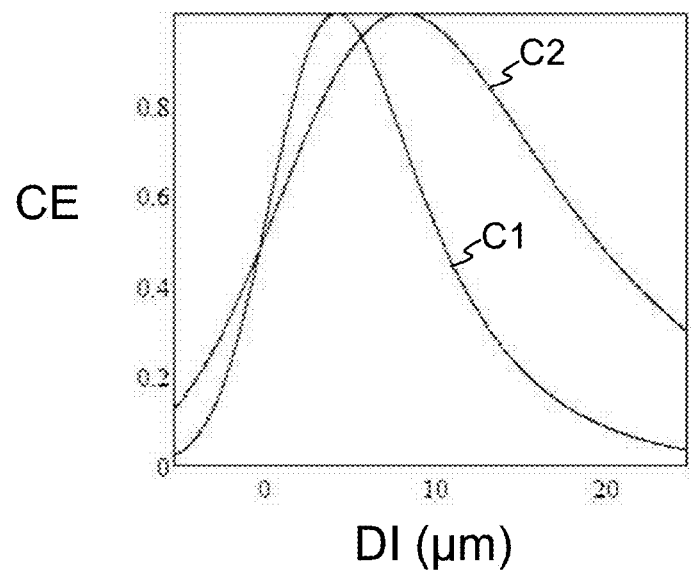
FIG. 13A is a plot of the calculated coupling efficiency CE (normalized to its maximum value) versus the impact distance DI (μm) for a fiber with $MFD_{60}$=5.4 μm (curve C1) and for a fiber with $MFD_C$=10 μm (curve C2)

The achievable coupling efficiency CE depends on the tolerance in the positioning of fiber 60 with respect grating coupler 30. FIG. 13A is a plot of the calculated coupling efficiency CE (normalized to its maximum value) versus the impact distance DI (μm) for a fiber 60 with $MFD_{60}$=5.4 μm (curve C1) and for a fiber with $MFD_{60}$=10 μm (curve C2). The position tolerance between fiber 60 and grating coupler 30 can be defined as the interval of the impact distances DI corresponding to the drop in the maximum coupling efficiency CE by 1 dB. This means that a higher accuracy in the positioning of fiber 60 is needed.

Figure 13B:
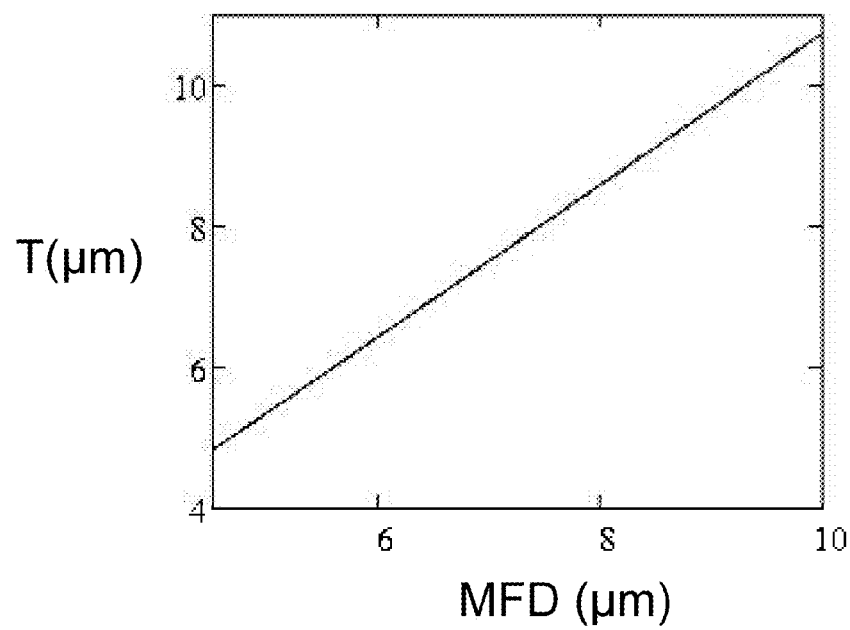
FIG. 13B is a plot of the tolerance T (μm) versus the MFD (μm), showing that the tolerance T increases linearly with an increase in the MFD.

FIG. 13B is a plot of the tolerance T (μm) versus the MFD (μm) and shows that the tolerance T increases linearly with an increase in the MFD. Thus, for $MFD_C$=10.0 μm, the tolerance is 10.7 μm, whereas for $MFD_{60}$=5.4 μm the tolerance is 5.8 μm. While the tolerance is smaller for the smaller $MFD_{60}$, it is still reasonable. It is also noted that, as can be seen from FIG. 13A, the effect of the deviation of the position of fiber 60 on the coupling efficiency CE is not symmetric. The effect of a decrease in the impact distance DI relative to its optimum value is more critical than that of the increase.

An aspect of the disclosure includes a method of optically coupling light 66 into PIC 10. The method includes transmitting light 66 through at least one core 67 of fiber 60, wherein the core defines $MFD_{60}$ to be in the range of 5 μm ≤ $MFD_{60}$ ≤ 6 μm. The method also includes emitting the transmitted light 66 from fiber end 62 from the at least one core 67 to at least one grating coupler 30. The method further includes directing the emitted light 66 from the at least one grating coupler 30 to at least one silicon waveguide 40 optically coupled thereto. The optical coupling of light 66 from the at least one core 67 to the at least one silicon waveguide 40 is accomplished with a coupling efficiency CE≥0.7.

Another aspect of the disclosure includes a method of optically coupling light 66 from at least one silicon waveguide 40 to at least one core 67 of fiber 60. The method includes transmitting light 66 from the at least one silicon waveguide 40 to the at least one grating coupler 30 that is optically coupled thereto. The method also includes directing the transmitted light 66 from the at least one grating coupler 30 to at least one core 67 of fiber 60 through fiber end 62. The at least one core 67 defines $MFD_{60}$ to be in the range of 5 μm ≤ $MFD_{60}$ ≤ 6 μm. The optical coupling of light 66 from the at least one silicon waveguide 40 to the at least one core 67 is accomplished with a coupling efficiency CE≥0.7.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A grating-coupler assembly for optically coupling light into or out of a photonic integrated circuit (PIC), comprising:
   a silicon-on-insulator (SOI) substrate;
   at least one silicon waveguide supported by the SOI substrate, wherein the silicon waveguide is optically coupled to one or more PIC components on the PIC;
   at least one grating coupler supported by the SOI substrate and optically coupled to the at least one silicon waveguide;
   an optical fiber having an end and at least one core having a mode-field diameter $MFD_{60}$ in the range 5

μm≤MFD$_{60}$≤6 μm, wherein the optical-fiber end is disposed adjacent the at least one grating coupler; and wherein the at least one core of the optical fiber and the at least one grating coupler define a coupling efficiency CE≥0.7.

2. The grating-coupler assembly according to claim 1, further comprising an intervening medium of refractive index n$_m$>1 between the optical-fiber end and the grating coupler.

3. The grating-coupler assembly according to claim 2, wherein the intervening medium comprises either an epoxy or an index-matching gel.

4. The grating-coupler assembly according to claim 1, wherein the optical fiber includes a tapered end portion that includes the optical-fiber end.

5. The grating-coupler assembly according to claim 1, wherein the optical fiber comprises multiple cores and wherein the at least one grating coupler comprises corresponding multiple grating couplers.

6. The grating-coupler assembly according to claim 1, wherein the at least one grating coupler has a coupler footprint that is reduced by at least 15% as compared to a grating-coupler footprint as defined by a single-mode fiber having a mode-field diameter MFD$_C$ of nominally 10 μm.

7. The grating-coupler assembly according to claim 1, wherein the mode-field diameter MFD$_{60}$ is nominally 5.4 μm.

8. The grating-coupler assembly according to claim 1, wherein an area reduction ratio R ranges from 0.25 to about 0.35 compared to a grating-coupler footprint defined by a single-mode fiber having a mode field diameter MFD$_C$ of about 10 μm.

9. A grating-coupler assembly for optically coupling light into or out of a photonic integrated circuit (PIC), comprising:
   a silicon waveguide supported by a silicon-on-insulator (SOI) substrate, wherein the silicon waveguide is optically coupled to one or more PIC components on the PIC;
   a grating coupler supported by the SOI substrate and optically coupled to the silicon waveguide, the grating coupler having a coupler footprint;
   an optical fiber having an end and at least one core having a mode-field diameter MFD$_{60}$ in the range 5 μm≤MFD$_{60}$≤6 μm, wherein the optical-fiber end is disposed adjacent the grating coupler, with an intervening medium of refractive index n$_m$>1 between the optical-fiber end and the grating coupler;
   wherein the at least one core of the optical fiber and the grating coupler define a coupling efficiency CE≥0.7; and
   wherein the coupler footprint is reduced by at least 10% from a coupler footprint defined by a single-mode optical fiber having a mode-field diameter of nominally 10 μm.

10. The grating-coupler assembly according to claim 9, wherein the optical fiber includes a tapered end portion that includes the optical-fiber end.

11. A method of optically coupling light into a photonic integrated circuit (PIC) that includes at least one grating coupler optically coupled to at least one silicon waveguide, and one or more PIC components on the PIC optically coupled to the silicon waveguide, the method comprising:
   transmitting light through at least one core of an optical fiber having an end, the at least one core defining a mode-field diameter MFD$_{60}$ for the transmitted light, wherein the mode-field diameter MFD$_{60}$ is in the range 5 μm≤MFD$_{60}$≤6 μm;
   emitting the transmitted light from the optical-fiber end to the at least one grating coupler; and
   directing the emitted light from the at least one grating coupler to the at least one silicon waveguide such that the optical coupling of light from the at least one core to the at least one silicon waveguide is accomplished with a coupling efficiency CE≥0.7, and the emitted light is received by the one or more PIC components from the at least one silicon waveguide.

12. The method according to claim 11, further comprising transmitting the emitted light through an intervening medium of refractive index n$_m$>1 that resides between the optical-fiber end and the at least one grating coupler.

13. The method according to claim 12, wherein the optical fiber comprises multiple cores, the at least one grating coupler comprises multiple grating couplers and wherein each core is optically coupled to one of the grating couplers.

14. The method according to claim 12, wherein the at least one grating coupler has a coupler footprint that is reduced by at least 15% as compared to a grating-coupler footprint as defined by a single-mode fiber having a mode-field diameter of nominally 10 μm.

15. A method of optically coupling light from a photonic integrated circuit (PIC) that includes at least one grating coupler optically coupled to at least one silicon waveguide, and one or more PIC components on the PIC optically coupled to the silicon waveguide, the method comprising:
   transmitting light from the at least one silicon waveguide to the at least one grating coupler;
   directing the transmitted light from the at least one grating coupler to at least one core of an optical fiber having an end arranged adjacent the at least one grating coupler, the at least one core defining a mode-field diameter MFD$_{60}$ for the transmitted light, wherein the mode-field diameter MFD$_{60}$ is in the range 5 μm≤MFD$_{60}$≤6 μm; and
   wherein optical coupling of light from the at least one silicon waveguide to the at least one core is accomplished with a coupling efficiency CE≥0.7, and the transmitted light is received by the one or more PIC components from the at least one silicon waveguide.

16. The method according to claim 15, further comprising transmitting the light through an intervening medium of refractive index n$_m$>1 that resides between the optical-fiber end and the at least one grating coupler.

17. The method according to claim 15, wherein the optical fiber comprises multiple cores, the at least one grating coupler comprises multiple grating couplers and wherein each core is optically coupled to one of the grating couplers.

18. The method according to claim 15, wherein the at least one grating coupler has a coupler footprint that is reduced by an amount by at least 15% as compared to a grating-coupler footprint as defined by a single-mode fiber having a mode-field diameter of nominally 10 μm.

* * * * *